United States Patent
Madge et al.

(10) Patent No.: US 7,861,827 B2
(45) Date of Patent: Jan. 4, 2011

(54) OIL MANIFOLD FOR LUBRICATING BEARINGS

(75) Inventors: James Henry Madge, Erie, PA (US); Jeremy Clayton Plummer, Erie, PA (US)

(73) Assignee: General Electric Company, Schenectady, NY (US)

(*) Notice: Subject to any disclaimer, the term of this patent is extended or adjusted under 35 U.S.C. 154(b) by 149 days.

(21) Appl. No.: 11/934,157

(22) Filed: Nov. 2, 2007

(65) Prior Publication Data
US 2009/0114480 A1    May 7, 2009

(51) Int. Cl.
*F16H 57/04* (2010.01)
*F16N 7/00* (2006.01)
*F01M 1/00* (2006.01)

(52) U.S. Cl. ............... 184/6.12; 184/5.1; 184/6.11; 184/11.2; 184/13.1; 184/54; 74/467; 475/159; 475/346; 475/347

(58) Field of Classification Search ............ 184/6.12, 184/11.1–11.5, 6, 5.1, 6.11, 6.14, 13.1, 6.16, 184/6.5, 54; 74/467–468; 475/346; 384/471–477; 123/196 R, 197.3, 73 A, 44 D, 450; F16N 7/26; F16H 57/04, 57/08; F01M 1/00, 9/06
See application file for complete search history.

(56) References Cited

U.S. PATENT DOCUMENTS

| | | | | |
|---|---|---|---|---|
| 3,749,459 A | * | 7/1973 | Matuzaki et al. | 384/473 |
| 4,221,279 A | | 9/1980 | Jones et al. | |
| 4,842,100 A | * | 6/1989 | Cameron et al. | 184/6.2 |
| 5,653,658 A | * | 8/1997 | Bouteille | 475/159 |
| 6,997,618 B2 | * | 2/2006 | Delano | 384/462 |
| 2006/0231338 A1 | * | 10/2006 | Ichioka et al. | 184/6 |
| 2007/0295557 A1 | | 12/2007 | Aldridge | |

FOREIGN PATENT DOCUMENTS

JP    10252869    9/1998

* cited by examiner

*Primary Examiner*—Robert A Siconolfi
*Assistant Examiner*—San Aung
(74) *Attorney, Agent, or Firm*—Robert Wawrzyn; Jonathan M. Hines; Trego, Hines & Ladenheim, PLLC

(57) ABSTRACT

A bearing oil supply assembly includes (a) a plate member with opposed first and second sides, the plate member having a first bore formed in the first side which is adapted to receive a first bearing; (b) an annular manifold attached to the plate member such that the plate member and the manifold cooperatively define an annular oil gallery; and (c) a plurality of passages formed in the manifold, the passages cooperating with the plate member to define a plurality of generally axially-directed pathways in fluid communication with the first bore and the oil gallery. The passages are substantially evenly spaced around the circumference of the manifold. The oil supply assembly may be used to supply oil to two bearings carrying separate shafts running at different speeds.

13 Claims, 9 Drawing Sheets

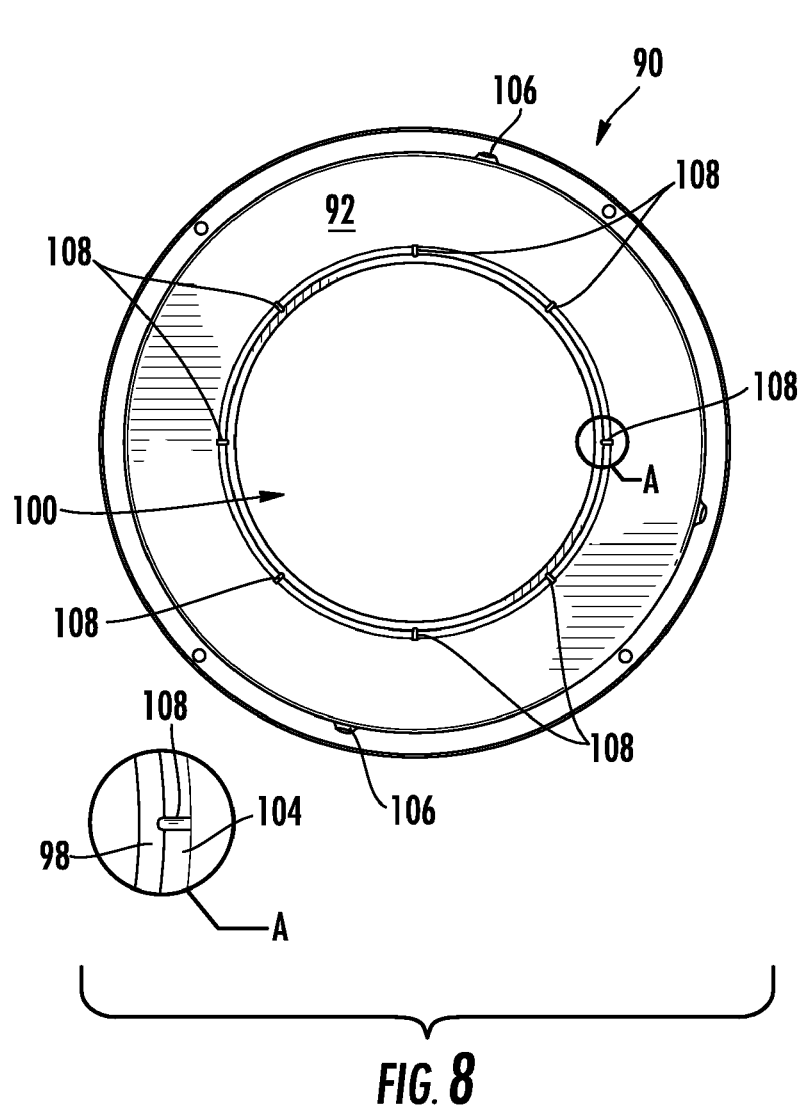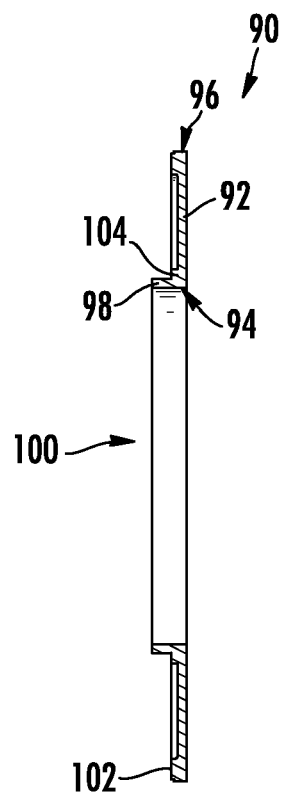
FIG. 8
FIG. 9

முடிவு 1

OIL MANIFOLD FOR LUBRICATING BEARINGS

BACKGROUND OF THE INVENTION

This invention relates generally to bearings, and more particularly to lubrication of bearings subject to changing axial and radial loads.

Lubrication of rolling element bearings usually requires a single jet of oil in the bearing's load zone. This oil flow is sufficient for most operating conditions encountered by such bearings. However, in some situations, such as large gearboxes for wind turbines, one or more rolling element bearings are required to take axial thrust continuously for short periods of time. A single jet of oil is not sufficient for this running condition. In this condition, lubricating oil must be directed to the roller ends uniformly over the full diameter of the bearing. It is known to provide such lubrication using multiple oil pipes and nozzles, but this increases parts count and creates potential leak points at the multiple connections. It is also known to modify a structural component to include oil supply passages for a bearing. However, this complicates manufacture and increases costs, and places a component at risk for being scrapped because of manufacturing errors.

BRIEF SUMMARY OF THE INVENTION

These and other shortcomings of the prior art are addressed by the present invention, which provides an annular manifold attached to a plate-like structural member that carries one or more bearings, so that the plate member and the manifold cooperatively define an annular oil gallery. A plurality of passages are formed in the manifold which cooperate with the structural member to define a plurality of generally axially-directed pathways in fluid communication with at least one of the bearings and the oil gallery. The passages are substantially evenly spaced around the circumference of the manifold, so as to promote uniform oil supply to the bearings even under quickly changing load conditions.

According to one aspect of the invention, a bearing oil supply assembly for a gearbox includes: (a) a plate member with opposed first and second sides, the plate member having a first bore formed in the first side which is adapted to receive a first bearing; (b) an annular manifold attached to the plate member such that the plate member and the manifold cooperatively define an annular oil gallery; and (c) a plurality of passages formed in the manifold, the passages cooperating with the plate member to define a plurality of generally axially-directed pathways in fluid communication with the first bore and the oil gallery. The passages are substantially evenly spaced around the circumference of the manifold.

According to another aspect of the invention, an oil supply assembly for a gearbox includes: (a) a housing; (b) a midplate disposed in the housing having opposed first and second sides, the midplate having a first bore formed in the first side; (c) a first bearing received in the first bore; (d) an annular manifold attached to the midplate opposite the first bearing, such that the midplate and the manifold cooperatively define an annular oil gallery; and (e) a plurality of passages formed in the manifold, the passages cooperating with the midplate to define a plurality of generally axially-directed pathways in fluid communication with the first bore and the oil gallery. The passages are substantially evenly spaced around the circumference of the manifold.

BRIEF DESCRIPTION OF THE DRAWINGS

The invention may be best understood by reference to the following description taken in conjunction with the accompanying drawing figures in which:

FIG. 8 is a top plan view of the oil manifold shown in FIG. 5;

FIG. 9 is a cross-sectional view of the oil manifold of FIG. 7; and

DETAILED DESCRIPTION OF THE INVENTION

Figure 1:
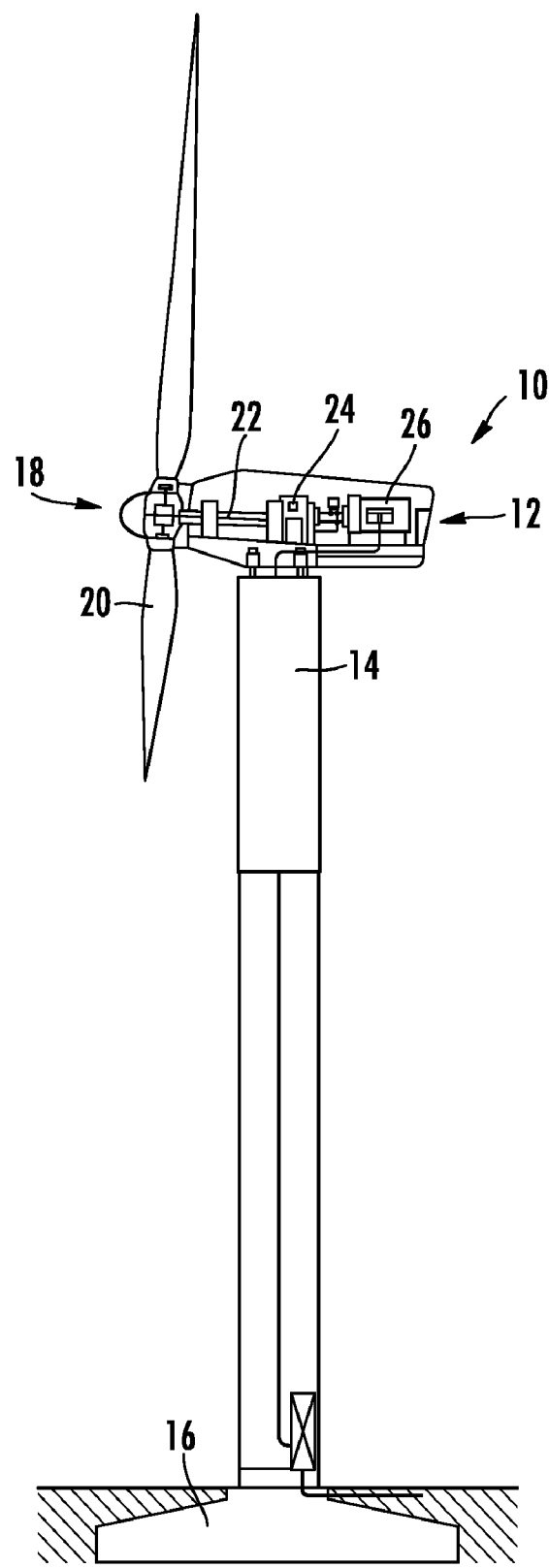
FIG. 1 is a partially-sectioned side view of a wind turbine including an oil manifold constructed in accordance with an aspect of the present invention.

Referring to the drawings wherein identical reference numerals denote the same elements throughout the various views, FIG. 1 depicts a wind turbine 10 including a nacelle 12 mounted on the upper end of a tower 14. The tower 14 is anchored to the ground via foundations 16. A rotor 18 having blades 20 is mounted on one end of the nacelle 12. A rotor shaft 22 couples the rotor 18 to a gearbox 24, which is in turn coupled to an generator (or alternator) 26.

Figure 2:
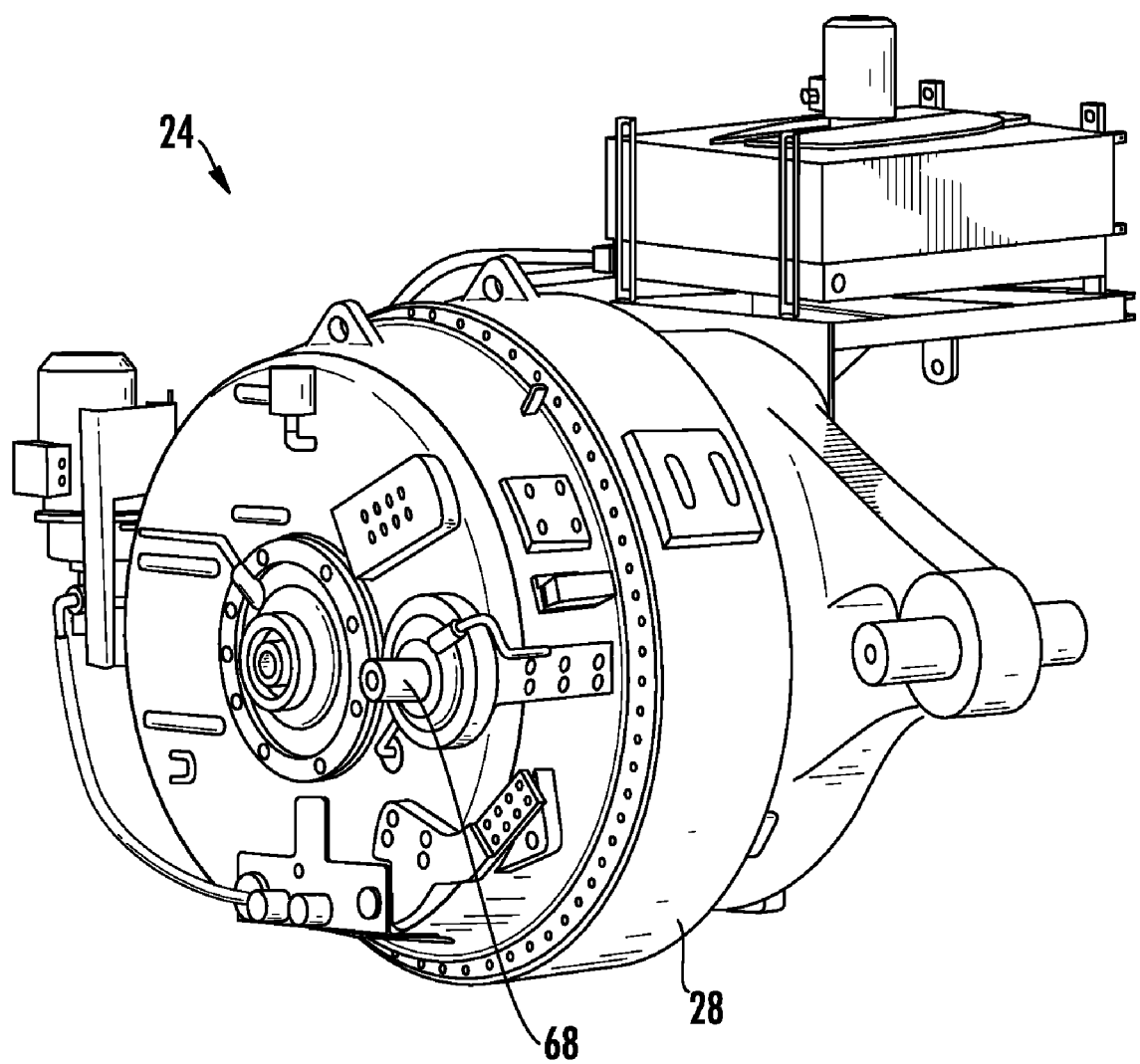
FIG. 2 is a perspective view of a gearbox of the wind turbine of FIG. 1.
Figure 3:
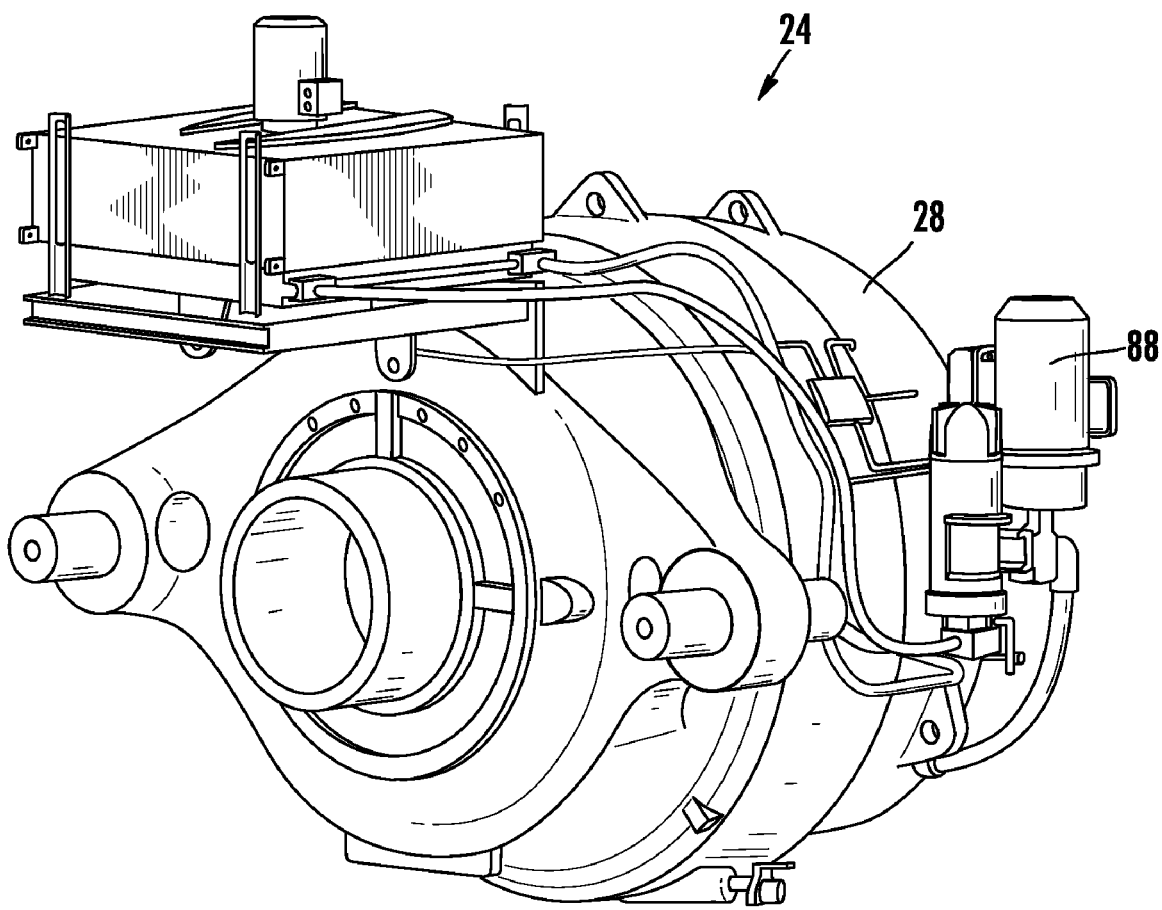
FIG. 3 is another perspective view of the gearbox of FIG. 2.
Figure 4:
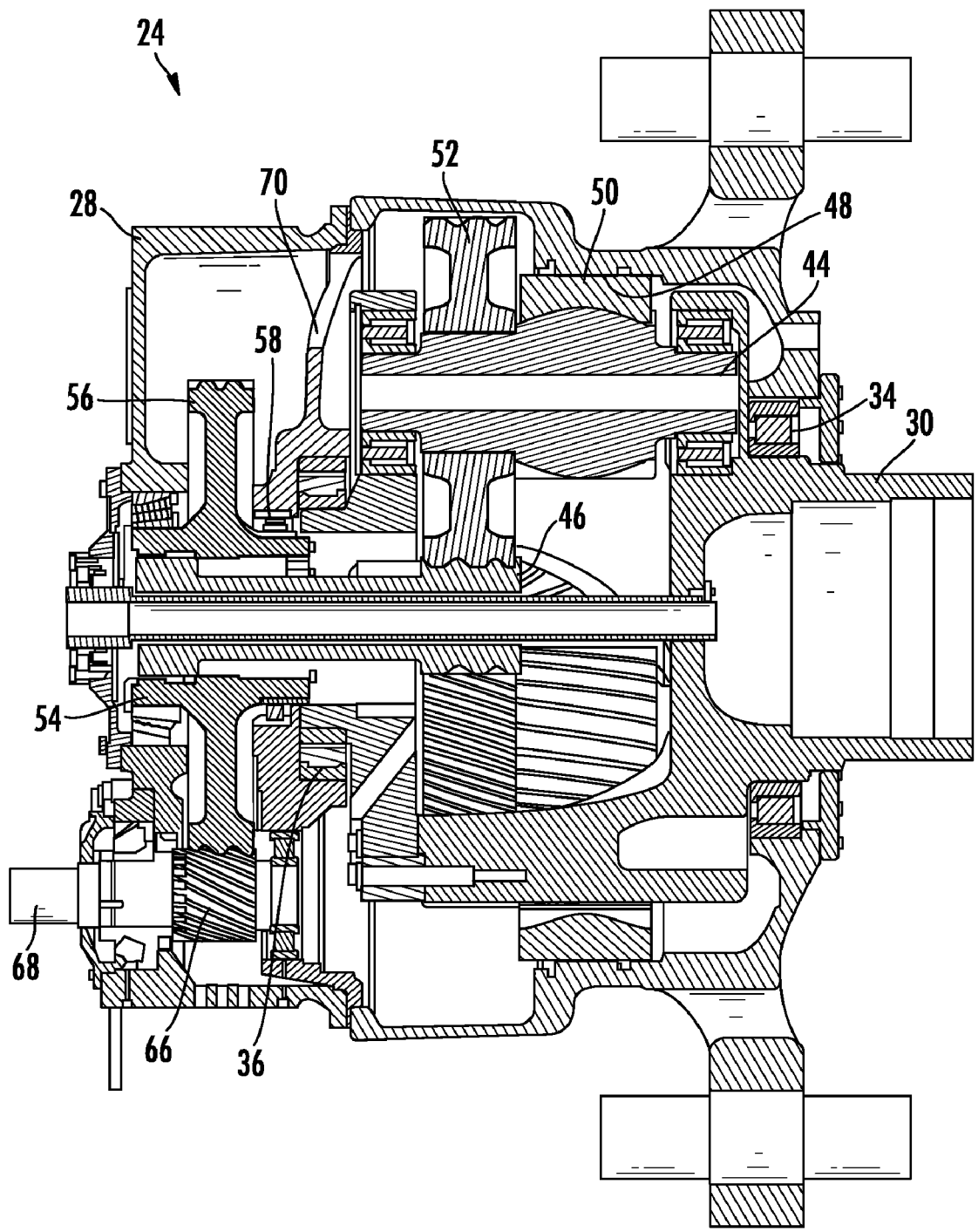
FIG. 4 is a cross-sectional view of the gearbox of FIG. 2.

The gearbox 24, shown in FIGS. 2-4, is a multi-stage planetary unit enclosed within a housing 28. The gear train comprises a carrier 30 coupled to the rotor shaft 22 and mounted to the housing 28 in an upwind carrier bearing 34 and a downwind carrier bearing 36. It is noted that the terms "downwind" and "upwind" as used herein refer to directions relative to the intended flow of wind through the wind turbine 10 during operation. These positional terms are used merely for convenience in description; the actual components described herein need not have any particular orientation with respect to the airflow. In the illustrated example, the downwind carrier bearing 36 is a cylindrical roller bearing having an inner race 38, an outer race 40, and a plurality of rollers 42 (best seen in FIG. 5) and is configured to withstand axial loads as well as radial loads. A plurality of planet gears 44 rotate with the carrier 30. Each planet gear 44 includes a primary mesh 48 that engages a stationary ring gear 50, and a secondary mesh 52 that engages a sun gear 46 which is coupled to a center shaft 54. The center shaft 54 is splined to a high speed gear 56 that runs in a high speed gear bearing 58. In the illustrated example, the high speed gear bearing 58 is a cylindrical roller bearing having an inner race 60, an outer race 62, and a plurality of rollers 64 (best seen in FIG. 5), and is configured to withstand axial loads as well as radial loads The high speed gear 56 engages a high speed pinion 66 that is in turn coupled to a pinion shaft 68. The pinion shaft 68 is coupled to the generator 26 and to a hydraulically-actuated parking brake (not shown).

Figure 5:
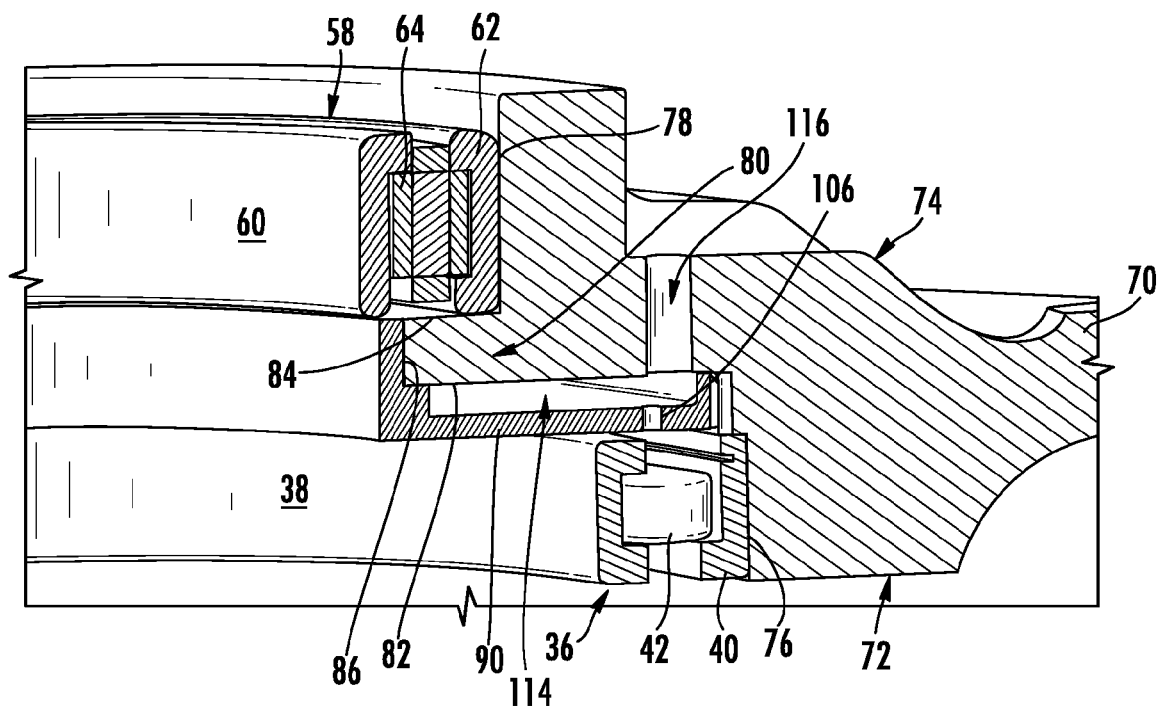
FIG. 5 is a sectional perspective view of a portion of the gearbox of FIG. 4, showing an oil manifold constructed in accordance with the present invention.
Figure 6:
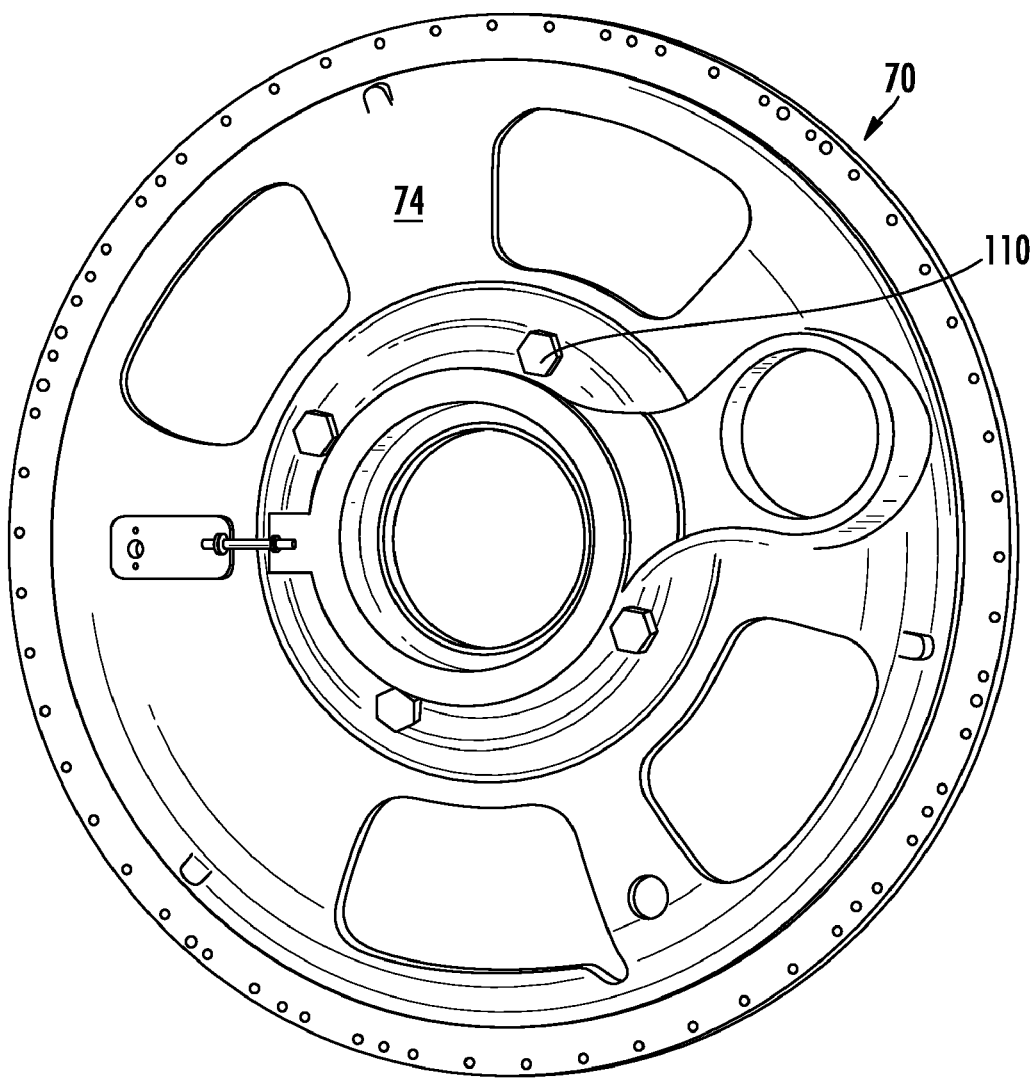
FIG. 6 is a perspective view of a midplate of the gearbox of FIG. 4, seen from a downwind direction relative to the wind turbine.
Figure 7:
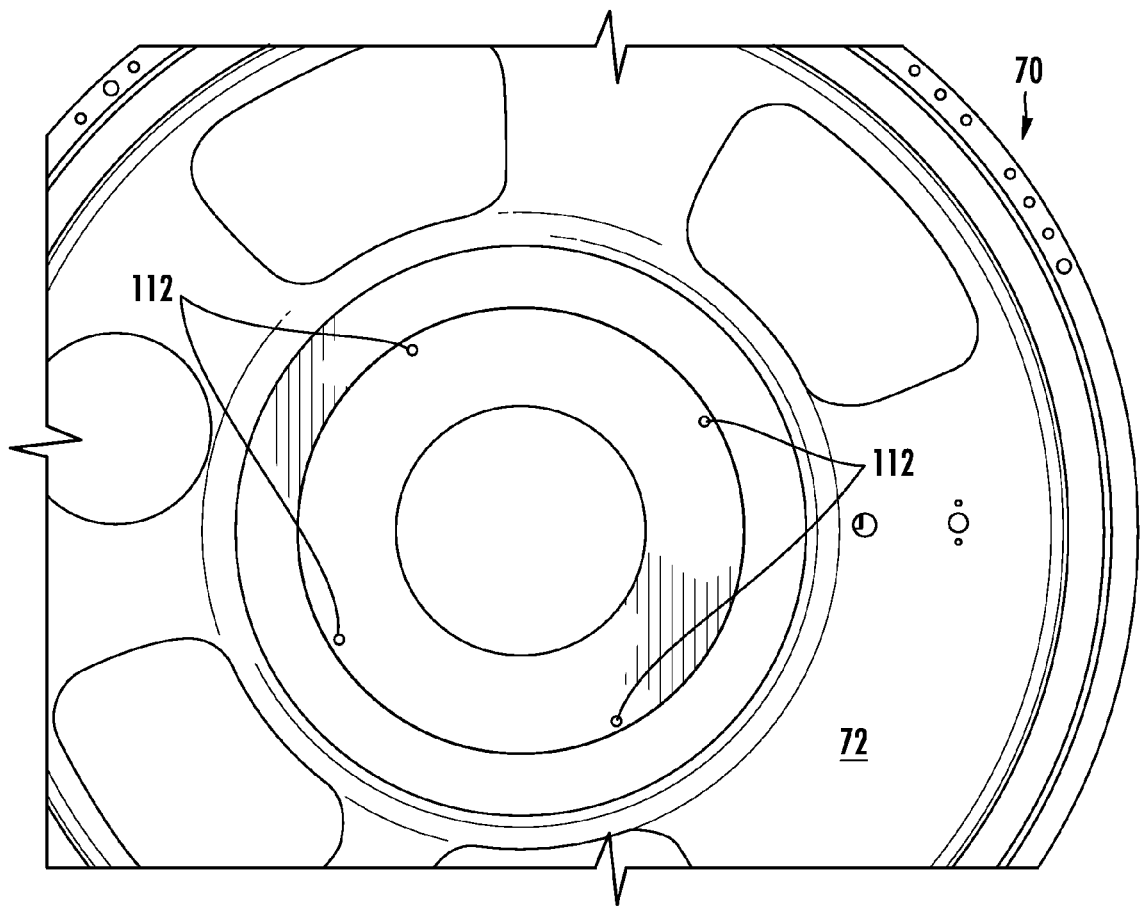
FIG. 7 is a perspective view of the midplate of FIG. 6, seen from an upwind direction relative to the wind turbine.

Within the housing 28 is a stationary, plate-like member referred to as "midplate" 70, shown in more detail in FIGS. 5-7. The midplate 70 has opposed upwind and downwind sides 72 and 74, an upwind bore 76 that receives the outer race 40 of the downwind carrier bearing 36, and a downwind bore 78 that receives the outer race 62 of the high speed gear bearing 58. Although not shown in FIG. 5, the carrier 30 is received in the inner race 38 of the downwind carrier bearing 36, and the high speed gear 56 is received in the inner race 60 of the high speed gear bearing 58. The midplate 70 includes a radially-extending flange 80 with an upwind face 82, an opposed downwind face 84, and an inner face 86 that spans therebetween. The upwind face 82 joins the upwind bore 76, and the downwind face 84 joins the downwind bore 78.

The gearbox 24 is a wet sump design in which oil for lubrication and cooling is circulated by an electrically-powered pump 88 (See FIG. 2) and supplied to various gears, shafts, bearings, etc. within the housing 28 in a conventional fashion.

In operation, the gearbox 24 converts the relatively high torque, low speed (e.g. about 18 RPM) rotational input from the rotor 18 to a higher speed (e.g. about 1440 RPM), lower torque input suitable for operation of the generator 26. Because several of the gear meshes in the gearbox 24 are helical rather than spur, substantial axial loads are placed on the gears within when they experience angular acceleration or deceleration relative to each other.

One specific high loading condition occurs when the rotor 18 is subjected to an emergency stop. In this situation, the hydraulic parking brake, in response to predetermined operating limits, suddenly applies a strong clamping force to the pinion shaft 68, rapidly stopping its rotation. The rotor 18, absorbing energy from the wind, is still applying a large torque to the carrier 30. Because of the helical gear profiles, a very large thrust is applied to the high speed gear 56 in the "upwind" direction (e.g. toward the rotor 18). For example, in a known type of wind turbine 10 rated at about 1500 kW power output, the thrust loads could be in the range of about 110 kN (25,000 lbf.) to about 130 kN (30,000 lbf.). In such a situation, the increase in thrust loading on the high speed gear bearing 58 is nearly instantaneous. Under these conditions, lubrication cannot be reliably provided to the high speed gear bearing 58 by a single oil passage. Accordingly, oil is supplied to the high speed gear bearing 58 using a manifold 90 which is attached to the midplate 70.

FIGS. 8 and 9 illustrate the manifold 90 in more detail. It has a generally annular ring portion 92 with inner and outer edges 94 and 96. An inner rim 98 extends axially downwind from the periphery of the inner edge 94 to define a central opening 100, and cooperates with the ring portion 92 to define an L-shaped cross-section. An outer rim 102 extends axially downwind from the outer edge 96 of the ring portion 92. A square-section land 104 is formed at the intersection of the inner rim 98 and the ring portion 92.

One or more feed holes 106 are formed through the ring portion 92 of the manifold 90, adjacent to and partially through the outer rim 102. As shown in detail view "A" of FIG. 8, plurality of axially-extending oil supply slots 108 are formed in the inner rim 98. In the particular example shown, eight oil supply slots 108 are spaced evenly around the periphery of the manifold 90, although the exact number is not critical. Each of the oil supply slots 108 passes through the land 104 and the radially outer surface of the inner rim 98.

As shown in FIGS. 6 and 7, the manifold 90 is mounted to the upstream side 72 of the midplate 70 and received in the upwind bore 76. In the illustrated example, bolts 110 extend through the midplate 70 and are threaded into mounting holes 112 in the manifold 90 to clamp it to the midplate 70. Other types of fasteners, adhesives, or bonding techniques (such as brazing or welding) could be used instead of the bolts 110. When assembled to the midplate 70, the outer rim 102 seals against the upwind bore 76 and the upwind face 82 of the flange 80, and the inner rim 98 seals against the inner face 86 of the flange 80. The assembled midplate 70 and manifold 90 define a 360° oil gallery 114.

Figure 10:
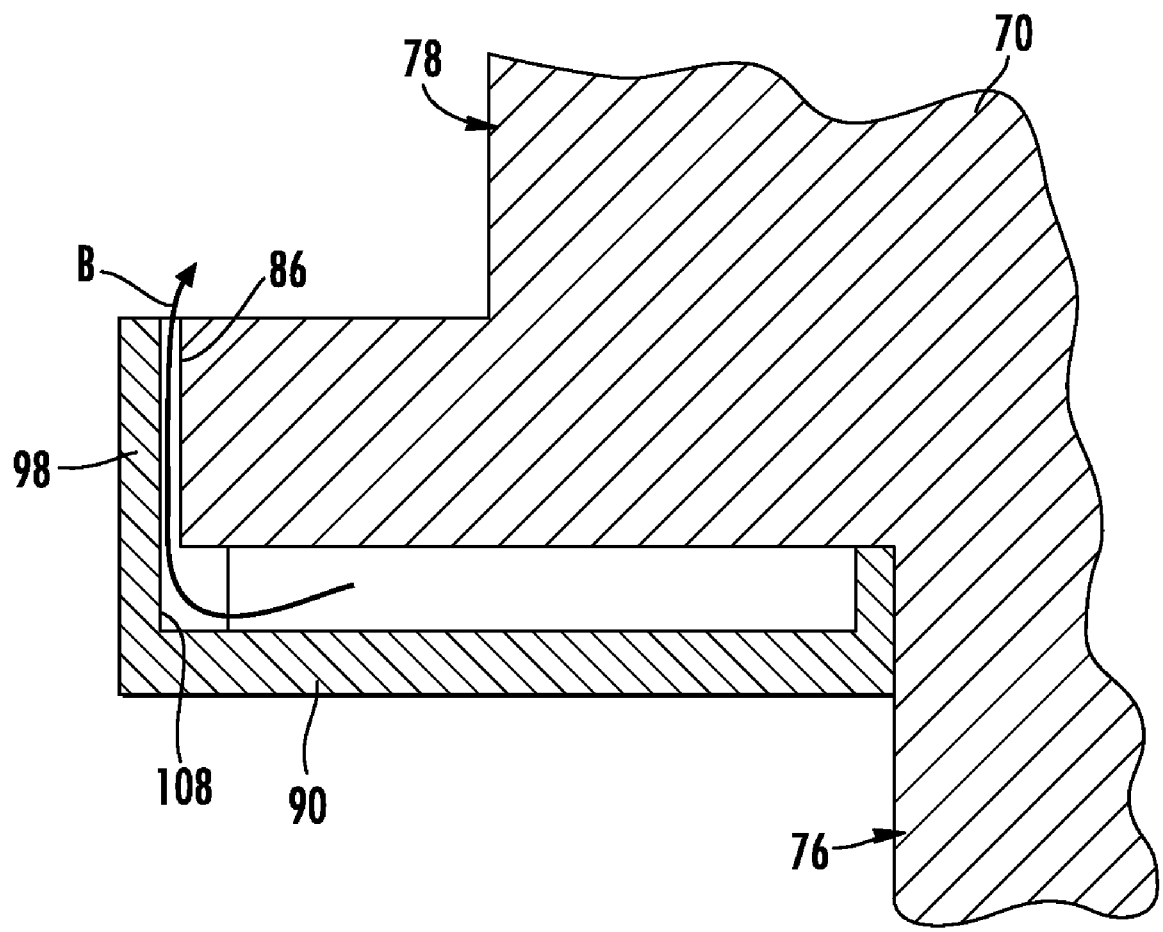
FIG. 10 is a cross-sectional view of a portion of a midplate with an attached manifold, showing an oil flow path thereof.

The operation of the manifold 90 will now be explained with reference to FIG. 5. In operation, pressurized oil is supplied to an oil inlet 116 which passes through the midplate 70 and communicates with the oil gallery 114. The oil flows radially around to fill the oil gallery 114. Some oil flows through the feed holes 106 in an upwind direction to supply the downwind carrier bearing 36. From the downwind carrier bearing 36, the oil drains to a low spot in the housing 28 and is then recirculated. Oil also flows from the oil gallery 114 radially inward, into the oil supply slots 108, then axially downwind through the oil supply slots 108, and discharges substantially directly at the rollers 64 of the high speed gear bearing 58 at several locations around the periphery of the high speed gear bearing 58. This flow path is shown at arrow "B" in FIG. 10. From the high speed gear bearing 58, the oil drains to a low spot in the housing 28 and is then recirculated. This arrangement provides lubrication oil to the roller ends uniformly over the full diameter of the high speed gear bearing 58. This ensures that pressurized oil flow can keep abreast of rapidly applied loads. The single manifold structure described herein supplies lubricating oil simultaneously to two separate shafts or other rotating members, i.e. the high speed gear bearing 58 and the downwind carrier bearing 36, which are rotating at different speeds. Also, importantly, no small or complex machined features (holes, slots, etc.) need be formed in the relatively large and expensive midplate 70 in order to provide this oil flow. This significantly reduces the cost of the midplate 70 and reduces the risk of having to scrap the midplate 70 because of production errors.

The foregoing has described an oil manifold for a gearbox. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An oil supply assembly for a gearbox, comprising:
    (a) a plate member with opposed first and second sides, the plate member having a first bore formed in the first side which is adapted to receive a first bearing, the two sides separated by a radially-inwardly extending flange which has opposed first and second faces with an inner face spanning therebetween;
    (b) an annular manifold attached to the plate member on the second side in a fixed relationship relative to the plate member so that it engages the second side and the flange, such that the plate member and the manifold cooperatively define an annular oil gallery, wherein the manifold comprises:

(i) a ring portion having radially inner and outer edges;
(ii) an inner rim extending axially from the inner edge, the inner rim of the manifold bearing against the inner face of the flange; and
(iii) an outer rim extending axially from the outer edge; and
(c) a plurality of passages formed in the manifold, the passages cooperating with the plate member to define a plurality of generally axially-directed pathways in fluid communication with the first bore and the oil gallery, the passages being substantially evenly spaced around the circumference of the manifold and extending along a junction between the inner face and the inner rim.

2. The oil supply assembly of claim 1 wherein the pathways are positioned to pass oil substantially directly into the first bearing.

3. The oil supply assembly of claim 1 further comprising a land extending around the inner rim at the intersection of the inner rim and the ring portion, where oil supply slots extend through the land.

4. The oil supply assembly of claim 1 wherein the plate member includes a second bore formed in the second side which is adapted to receive a second bearing, where the manifold is received in the second bore.

5. The oil supply assembly of claim 4 further comprising at least one feed hole formed in the ring portion of the manifold in fluid communication with the oil gallery and the second bore.

6. The oil supply assembly of claim 1 further comprising an oil inlet passing through the plate member and communicating with the oil gallery.

7. An oil supply assembly for a gearbox, comprising:
(a) a housing enclosing a gear train;
(b) a midplate disposed in the housing having opposed first and second sides, the midplate having a first bore formed in the first side, the two sides separated by a radially-inwardly extending flange which has opposed first and second faces with an inner face spanning therebetween;
(c) a first bearing received in the first bore;
(d) an annular manifold attached to the midplate on the second side opposite the first bearing member in a fixed relationship relative to the plate member and disposed at least partially within the second bore so that it engages the second side and the flange, such that the midplate and the manifold cooperatively define an annular oil gallery, wherein the manifold comprises:
(i) a ring portion having radially inner and outer edges;
(ii) an inner rim extending axially from the inner edge, the inner rim of the manifold bearing against the inner face of the flange; and
(iii) an outer rim extending axially from the outer edge; and
(e) a plurality of passages formed in the manifold, the passages cooperating with the midplate to define a plurality of generally axially-directed pathways in fluid communication with the first bore and the oil gallery, the passages being substantially evenly spaced around the circumference of the manifold and extending along a junction between the inner face and the inner rim.

8. The oil supply assembly of claim 7 wherein the first bearing is a rolling element bearing, and the passages are aligned so as to pass oil substantially directly into one or more rolling elements of the bearing.

9. The oil supply assembly of claim 7 further comprising a land extending around the inner rim at the intersection of the inner rim and the ring portion, where the oil supply slots extend through the land.

10. The oil supply assembly of claim 7 wherein the midplate includes a second bore formed in the second side which receives a second bearing, and wherein the manifold is received in the second bore between the midplate and the second bearing.

11. The oil supply assembly of claim 10 further comprising at least one feed hole formed in the ring portion of the manifold in fluid communication with the oil gallery and the second bore.

12. The oil supply assembly of claim 10 wherein a first rotating member is coupled to the first bearing, and a second rotating member separate from the first rotating member is coupled to the second bearing.

13. The oil supply assembly of claim 7 further comprising an oil inlet passing through the midplate and communicating with the oil gallery.

* * * * *